(12) United States Patent
Sikharulidze

(10) Patent No.: US 6,970,211 B2
(45) Date of Patent: Nov. 29, 2005

(54) BISTABLE NEMATIC LIQUID CRYSTAL DEVICE

(75) Inventor: David Sikharulidze, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 15 days.

(21) Appl. No.: 10/426,059

(22) Filed: Apr. 30, 2003

(65) Prior Publication Data
US 2003/0210375 A1 Nov. 13, 2003

(30) Foreign Application Priority Data
Apr. 30, 2002 (GB) .................................. 0209917

(51) Int. Cl.⁷ .............................................. G02F 1/13
(52) U.S. Cl. .................................... 349/93; 349/187
(58) Field of Search ........................ 349/86, 129, 93, 349/177, 123–125, 135, 88, 183, 186, 187

(56) References Cited

U.S. PATENT DOCUMENTS

| 4,333,708 | A | | 6/1982 | Boyd et al. | |
| 5,155,610 | A | | 10/1992 | Hikmet et al. | |
| 5,262,882 | A | | 11/1993 | Hikmet | |
| 5,305,126 | A | * | 4/1994 | Kobayashi et al. | 349/94 |
| 5,583,673 | A | * | 12/1996 | Onishi et al. | 349/89 |
| 5,796,459 | A | | 8/1998 | Bryan-Brown et al. | |
| 6,249,332 | B1 | * | 6/2001 | Bryan-Brown et al. | 349/129 |
| 6,327,017 | B2 | | 12/2001 | Barberi et al. | |

FOREIGN PATENT DOCUMENTS

| EP | 1 139 151 A1 | 10/2001 |
| GB | 2 330 214 A | 10/1997 |
| WO | 91/11747 | 8/1991 |
| WO | 92/00546 | 1/1992 |
| WO | 97/14990 | 4/1997 |
| WO | 99/18474 | 4/1999 |
| WO | 99/34251 | 7/1999 |
| WO | 01/40853 A1 | 6/2001 |

OTHER PUBLICATIONS

Ramdane, O. et al., "Memory-Free Conic Anchoring of Liquid Crystals on a Solid Substrate," PHYS. REV. LETT. 84, No. 17, Apr. 24, 2000, pp. 3871-3874.

Bartolino, R. et al., "Polarity sensitive electrooptical response in a nematic liquid crystal-polymer mixture," J. APPL. PHYS, vol. 85, No. 5, Mar. 1, 1999, pp. 2870-2874.

Dozov, I. et al., "Fast bistable nematic display using monostable surface switching," APPL. PHYS. LETT. 70(9), Mar. 3, 1997, pp. 1179-1181.

(Continued)

Primary Examiner—Dung T. Nguyen
Assistant Examiner—Thoi V. Duong

(57) ABSTRACT

A bistable liquid crystal device is made from a cell having first and second opposed spaced-apart cell walls enclosing a layer of nematic liquid crystal material having a photopolymerisable polymer precursor dissolved therein. Electrodes for applying an electric field across at least some of the liquid crystal material are on at least one cell wall. The inner surface of at least the first cell wall has a grating alignment structure. The cell is illuminated to photopolymerize the polymer precursor through the first cell wall. This causes polymerization close to the first cell wall and deposition of the resulting polymeric material as a coating on the grating alignment structure on the first cell wall.

16 Claims, 3 Drawing Sheets

OTHER PUBLICATIONS

Thurston, R. et al., "Mechanically Bistable Liquid-Crystal Display Structures," IEEE Trans. on Elec. Devices, vol. ED-27, No. 11, Nov., 1980, pp. 2069-2080.

Vorflusev, V. et al., "Phase-Separated Composite Films for Liquid Crystal Displays," SCIENCE, vol. 283, Mar. 19, 1999, pp. 1903-1905.

* cited by examiner

BISTABLE NEMATIC LIQUID CRYSTAL DEVICE

FIELD OF THE INVENTION

This invention relates to bistable nematic liquid crystal devices and their manufacture.

BACKGROUND OF THE INVENTION

Pixel bistability is a desirable attribute for a liquid crystal display ("LCD") because this eliminates the need constantly to refresh the display or to employ a silicon memory device behind each pixel, which becomes prohibitively expensive as the number of pixels increases. With bistability, only pixels that need to be changed need addressing, and simple matrix addressing may be employed.

Bistable LCDs are known which employ chiral tilted smectic liquid crystals, for example chiral smectic C materials, which exhibit ferroelectricity. However, there are many problems with ferroelectric LCDs, including a paucity of stable, room-temperature materials, wide-temperature-range materials, and structural defects which result from mechanical stress. An attempt to reduce mechanical stress defects is described by V Vorflusev and S Kumar, *Science*, vol. 283, 1903, 19 Mar. 1999. In the method called phase-separated composite film (PSCOF) technology, an LC is mixed with a photocurable prepolymer and introduced into a cell, one wall of which is provided with a rubbed polyvinyl alcohol alignment layer. The cell is then illuminated with UV light through the wall which does not have the alignment layer, causing phase separation. Phase separation results in a solidified film of polymer on the cell wall closer to the UV source, and an LC film between the polymer film and the alignment layer. Thin LC films can be made, and bonding of the polymer to the substrate adjacent to the LC at a number of random points is said to give increased rigidity and strength and decreased sensitivity to external mechanical deformations.

Because of the problems associated with ferroelectric smectic materials it is desirable to fabricate bistable LCDs using nematic LCs.

U.S. Pat. No. 4,333,708 discloses a multistable nematic LC device in which switching between stable configurations is by the movement of disclinations in response to electric fields.

In WO 91/11747 and WO 92/00546 it is proposed to provide a bistable surface by careful control of the thickness and evaporation of SiO coatings. A first stable planar orientation of the director could be obtained, and a second stable orientation in which the director is at an azimuthal angle (in the plane of the surface) of 90° to the first orientation in the plane of the surface, and tilted by around 30°.

In "Mechanically Bistable Liquid-Crystal Display Structures", R N Thurston et al, IEEE Trans. on Elec. Devices, Vol. ED-27, No. 11, November 1980, there are described two bistable nematic LC modes which are called "vertical-horizontal" and "horizontal-horizontal". In the vertical-horizontal mode, both cell walls are treated to give a roughly 45° tilt which permits the directors to be switched between two states in a plane which is perpendicular to the major surfaces of the device. In the horizontal-horizontal mode, the director is switchable between two angles in a plane parallel to the major surfaces of the device.

A bistable nematic display using monostable surface switching has been proposed by I. Dozov et al, *Appl. Phys. Lett.* 70 (9), 1179, 3 Mar. 1997. Switching in a thin cell is achieved between a low twist and a high twist state by the application of short electric pulses. Both cell wall surfaces have planar anchorings. Hydrodynamically coupled breaking of both anchorings results in the high twist state, and breaking only one anchoring results in the low twist state.

Polarity-sensitive switching has been found in a nematic LC-polymer mixture: R. Bartolino et al, *J. Appl. Phys.* Vol. 85 No. 5, 2870, 1 Mar. 1999. An LC/prepolymer mixture is polymerised in a cell so as to produce a gradient of concentrated polymer across the cell. It is thought that an asymmetric space charge distribution causes asymmetric electro-optical behaviour. A strong negative current produces a scattering (bright) state, and a weak positive current permits a transition to a homeotropic (dark) state.

Polymeric materials have also found use in modifying surface properties in LCDs. In U.S. Pat. No. 5,155,610 and U.S. Pat. No. 5,262,882 it has been proposed to provide a surface layer of an anisotropic gel or polymer network containing nonreactive LC material on a substrate. The gel can effect an inclined orientation of LC molecules. The surface layer contains liquid crystal molecules, the orientation of at least a part of the molecules being permanently fixed in the anisotropic gel. The angle of inclination of the molecules of the layer differs maximally from a minimum at the interface with the substrate to a maximum at the interface with the LC material when the layer is sufficiently thick. The layer is applied in a thickness to produce a desired angle of inclination at the interface with the LC material.

WO 99/18474 describes the use of oligomers or short chain polymers as lubricants for reducing anchoring energy at surfaces. The oligomers or short chain polymers are substantially non-crystalline in the presence of the LC, and possess a glass transition temperature below the operating temperature range of the device. O. Ou Ramdane et al, Phys. Rev. Lett. 84, No. 17, 24 Apr. 2000 describe the use of highly-mobile grafted polyisoprene or polystyrene for a similar purpose.

U.S. Pat. No. 5,796,459 describes the use of a bigrating alignment structure which induces bistable surface states with different azimuthal orientations. WO 97/14990 and WO 99/34251 describe the use of a monograting surface with a homeotropic local director, which has two stable states with different tilt angles within the same azimuthal plane. The homeotropic alignment is achieved by creating the monograting in a layer of material which causes spontaneous homeotropic orientation or, more practically, by coating the grating surface with a homeotropic inducing alignment agent such as lecithin. This grating surface is used to form a Zenithal Bistable Device or ZBD. WO 01/40853 describes the use of an alignment layer having a primary modulation and a secondary modulation. The primary modulation is formed from a plurality of small alignment areas each having a profiled surface and a homeotropic surface to provide both bistable pretilt alignments and alignment direction to LC molecules. The secondary modulation is formed by the spacing and/or the surface alignment directions of the small alignment areas.

A bistable nematic device was described EP 1 139 151, wherein one cell wall is provided with an array of upstanding features which have a shape and/or orientation to induce the local director to adopt two different tilt angles in substantially the same azimuthal direction. The arrangement is such that two stable molecular configurations can exist after suitable electrical signals have been applied. The features are typically microscopic posts, used to form a Post-Aligned Bistable Nematic device, or PABN.

Typically the depth of gratings or post alignment features of the ZBD or PABN devices is about 1 μm and the ratio depth/width is about 0.6. Gratings this deep are fairly challenging to replicate by mass manufacturing methods, so it is desirable to achieve bistable switching in a nematic device which makes use of shallower gratings.

Switching voltages of prior art grating or post alignment devices range between about 10–60 V and switching speeds range between 50 μs and 50 ms. These speeds can be optimised by changing the shape of the alignment features, but this may also undesirably alter the optical effect. Devices that are less sensitive to the shape of the alignment features are therefore also desirable. Reliable selection of the final state in a bistable device requires that there is some inherent asymmetry in the device; prior art devices either have a grating on one side only, or a different grating on both sides.

The present invention seeks to provide an improved bistable nematic device and a method of manufacturing same.

SUMMARY OF THE INVENTION

According to an aspect of the present invention there is provided a method of manufacturing a bistable liquid crystal device, the method comprising initially forming a cell from first and second opposed spaced-apart cell walls enclosing a layer of nematic liquid crystal material having a photopolymerisable polymer precursor dissolved therein;

wherein electrodes for applying an electric field across at least some of the liquid crystal material are provided on at least one cell wall;

and wherein the inner surface of at least the first cell wall is provided with a grating alignment structure;

and then illuminating the cell through the first cell wall with suitable light to effect photopolymerisation of the polymer precursor so as to cause polymerisation to occur close to the first cell wall and deposition of the resulting polymeric material as a coating on the grating alignment structure on the first cell wall.

We have surprisingly found that by providing such a polymeric material on the grating alignment structure of one cell wall but not the other, the cell can be made bistable even with the same alignment structure on both cell walls. Also surprisingly, we have found that the alignment effect is preserved even for relatively thin alignment features and a relatively thick polymeric coating. The device functions well with shallower gratings (less than about 1 μm) and is less sensitive to the shape of grating features than conventional displays. Preferably, the grating depth is in the range 100 to 600 nm.

The term 'grating alignment structure' is used herein to refer to conventional gratings, including monogratings and also bigratings such as described in WO 97/14990 and WO 99/34251. The term is also used to refer to surface microstructures such as described in EP 1 139 151, and other structures such as holes in a suitable medium, which impart a desired alignment to a LC when in contact with the LC. Typically, the grating alignment structure will be produced by photolithography or embossing. However other techniques could also be used to form the grating, for example eximer ablation through a mask, transfer from a carrier layer, or casting. The grating features will typically have a pitch in the range 100 nm to 10 μm, and a height or depth in the range 50 nm to 5 μm.

Depending on the nature of the grating alignment structure, the device may function in a number of bistable modes; for example the device may function in ZBD or PABN modes, or in a bistable mode such as described in U.S. Pat. No. 6,327,017.

It is preferred that the polymeric coating is crystalline or glassy at the operating temperature of the device, notably at room temperature; however the coating could be provided as a softer material, for example a gel, sol, or swollen network on the grating. Preferably the melting point or glass transition temperature is above 25° C., notably above 30° C. It is particularly preferred that the melting point or glass transition temperature is above 50° C.

The main requirement for the grating is that it should give good alignment to the LC molecules. Typically the grating depth is in the range 50 to 1000 nm. The other surface may be provided with any desired alignment, for example homeotropic or planar. Where the other surface alignment is planar or tilted planar, the configuration of the cell after assembly can be twisted (the alignment directions on both sides are normal to each other) or parallel (the alignment directions are parallel).

After filling the cell, light of appropriate wavelength (for example ultraviolet light) is shone through one side with the grating structure so as to cause polymerisation of the polymer precursor. It is particularly preferred that the nematic LC has positive dielectric anisotropy. The mixture may be heated above the isotropic transition temperature prior to exposure to the UV light. Alternatively, the mixture may be exposed to UV light with the LC in the nematic phase, optionally with the nematic aligned by a suitable electric field.

The polymerisation process is localised on the surface nearest the UV source. Light absorption can be described by $I=I_0 e^{-\alpha x}$, where $I_0$=intensity of UV light, $\alpha$=coefficient of light absorption, x=distance of absorption. In assuming that for UV $\alpha=10^4$ the light is absorbed mainly over the first ~1 μm, we may assume that intensive polymerisation is carried out only within this distance of the surface. The thin polymer layer is formed over an anisotropic alignment layer and the alignment capability of the grating structure is preserved. This means that the thin layer of polymer network follows the shape of the alignment features though it may make them more smooth. Coating one alignment surface gives asymmetric conditions to the cell; in particular the polymer layer has a higher resistivity than the LC in the volume of the cell. This means that an applied field will be concentrated in the region of the polymer network layer, making it easier to break the anchoring of the LC molecules to the surface with smaller applied voltages. In turn, this makes it possible to control the switching process and select the switched state.

Because the polymer coating is formed by the action of light through the grating, the resulting coating is expected to have unique properties. Diffraction through the grating may give a non-uniform optical field effect and a non-uniform coating profile. This non-uniformity may be enhanced by phase-separation occurring initially in grooves or at edges of the microstructures of the grating.

To an initially twisted cell is applied a voltage sufficient to break the anchoring on the surface with the cured layer, which is lower than that required to break at the other surface. When the electrical pulse is switched off the molecules close to the side with the stronger anchoring begin to relax first towards the initial state on the surface. Due to elastic coupling between the two plates the alignment from the plate with strong anchoring extends quickly through the cell and prevents the cell from realigning in a twisted state. Thus, the cell has been switched to a second, untwisted, state. If the grating surface induces a tilted state, as for example posts can do, this can amplify the effect and further assist switching. An applied pulse with a slow trailing edge switches the device in the reverse direction. In this case the voltage controls the relaxation process and molecules will orient on both substrates along their initial direction, which recreates the initial twisted state.

To ensure that an asymmetric cell can be produced from a cell having identical alignment structures on each substrate inner surface it is desirable that the polymeric material remains as a coating on substantially only one of the cell walls. Accordingly another aspect of the invention provides a bistable liquid crystal device comprising a first cell wall and a second cell wall enclosing a layer of nematic liquid crystal material; electrodes on both cell walls for applying an electric field across at least some of the liquid crystal material; substantially identical grating alignment structures formed on the inner surface of both cell walls; and a coating of a polymeric material on the alignment structure of the first cell wall but not on the alignment structure of the second cell wall, and in contact with the liquid crystal material; the arrangement being such that two stable molecular configurations can exist within the nematic layer after suitable electrical signals have been applied to the electrodes.

A practical method of manufacturing the device is by in situ photopolymerisation of a suitable monomer dissolved in the LC material, as described above. The polymerised material is insoluble in the LC and is deposited on the inner surface of the cell wall through which the UV light is directed.

The invention will now be further described, by way of example only, with reference to the following drawings.

DETAILED DESCRIPTION

Figure 1:
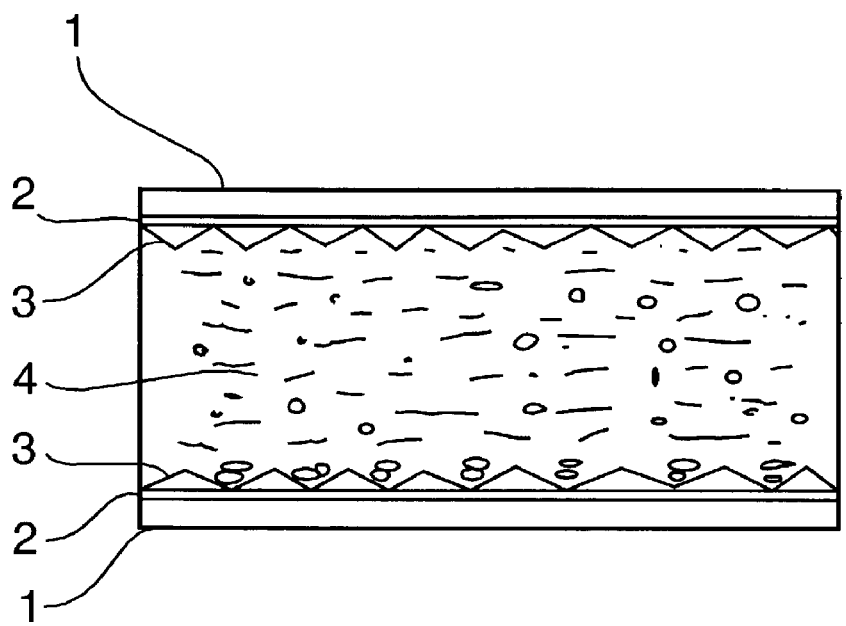
FIG. 1 diagrammatically shows a liquid crystal cell for use in manufacturing a display device in accordance with the invention.
Figure 2:
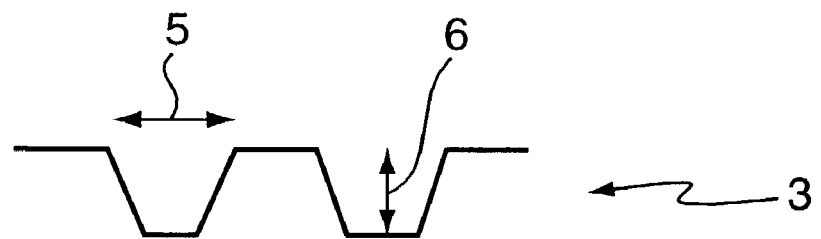
FIG. 2 shows a detail of the grating profile from FIG. 1.

The display cell of FIG. 1 comprises opposed spaced-apart glass or plastic plate substrates 1, each provided with transparent electrode patterns 2 on its inner surface. Alignment grating layers 3 are provided on each inner surface, on top of the electrodes 2. The grating layers 3 have a pitch 5 and a depth 6. A layer of a nematic LC material 4 is sandwiched between the substrates 1, having dissolved in it a photocurable monomer. Curing of the monomer by shining UV light through only one of the substrates 1 causes a polymer coating to form on the alignment structure 2 on that substrate. The cell changes after polymerisation from a symmetrical cell to an unsymmetrical cell.

Figure 3A:
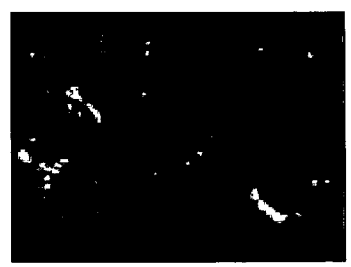
FIGS. 3 and 4 are photomicrographs showing two different bistable states of a display device in accordance with an aspect of the invention.
Figure 3B:
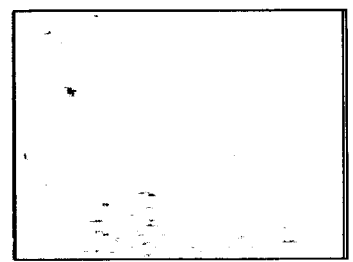

Experimentally we have used monogratings and post arrays with 200, 400 and 1000 nm depth. The thickness of the cells was varied between 2 to 5 $\mu$m using photocured glue with ball spacers on the boundary of the cell between the substrates. The cells were filled with a LC of positive dielectric anisotropy such as E7 or ZLI 2293 (both from Merck), to which was added an amount ranging from 1 to 10% of photopolymerisable monomer (Sartomer SR349) having a small amount of photoinitiator. The structure of SR349 is given in *J. Appl. Phys.* Vol. 85 No. 5, 2870, 1 Mar. 1999. The cells were heated until the LC mixture was isotropic (70 to 100° C.) and then illuminated from one side with the grating, with UV light for up to ten minutes. The time needed to effect polymerisation depends on factors such as the power of the UV lamp, the reactivity of the precursors, and the nature of the substrates. Typically, we found that illumination for 1 to 5 minutes sufficed to effect curing. Before and after the photocuring the textures of the cells were observed between crossed polarisers using a polarising microscope. Electrical pulses (1 to 50 ms, 0 to 100 V) were applied to the cells. Before photocuring, the cells' behaviour was independent of the sign of the applied pulse. For both polarities we observed switching from the initial texture, but not back. The texture after switching consisted of a lot of bright defects. After photocuring the cells exhibited bistable switching sensitive to the voltage polarity and amplitude. The texture that is formed after switching is uniform and very bright. FIGS. 3*a* and 3*b* show two stable textures of cells with in situ surface polymerisation in accordance with the invention, having glass substrates and photolithographically-formed gratings. In FIG. 3*a*, the LC has a planar texture, and in FIG. 3*b* it has a twisted texture. The LC is switched between these textures by the application of positive and negative pulses with 1 ms duration and 60 V amplitude. The cell is 3 $\mu$m thick and the grating is 1 $\mu$m deep. We have found that cells with identical grating structures on both walls become asymmetric in their properties after exposure to UV light through one wall only.

Figure 4A:
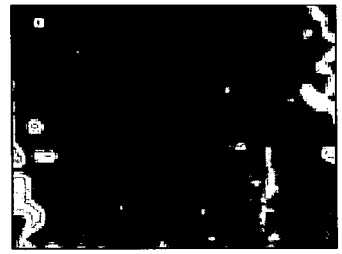
Figure 4B:

FIGS. 4*a* and 4*b* illustrate two electrically controlled stable states in a 10 $\mu$m thick twist cell with polymer substrates having an embossed grating. The texture is twisted in FIG. 4*a* and planar in FIG. 4*b*. The states are selected by the application of positive and negative pulses with duration 0.5 ms and amplitude 135 V.

Figure 5:
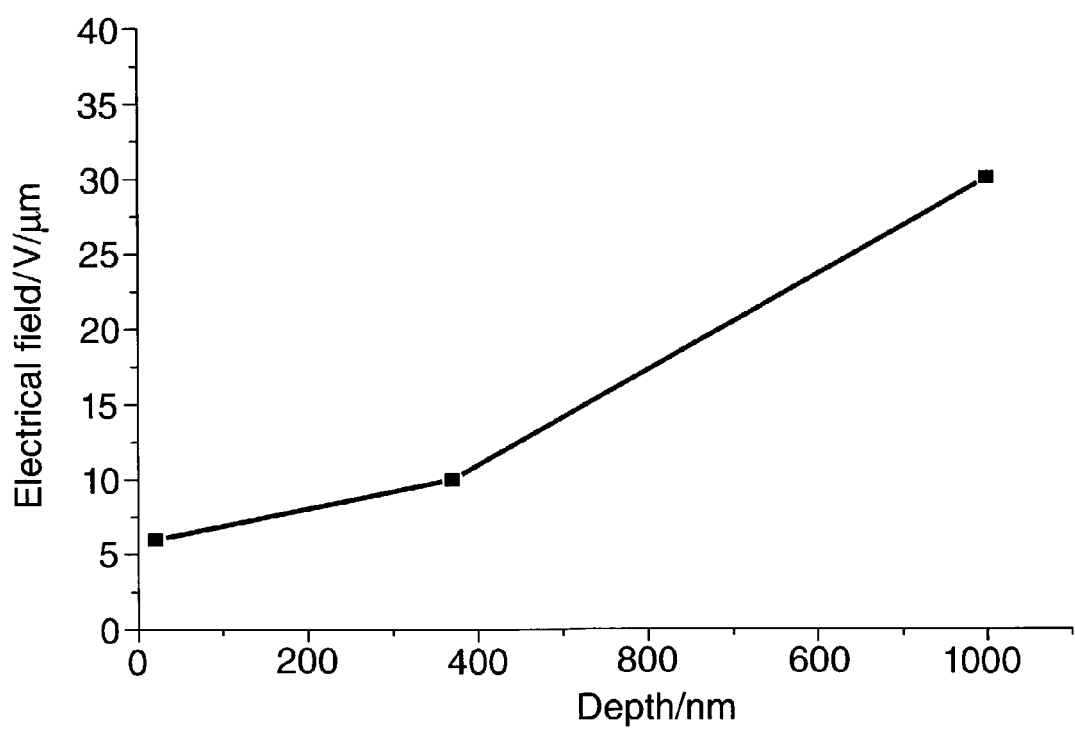
FIG. 5 is a graph of switching thresholds for different cells and gratings after photocuring.

Referring now to FIG. 5, the threshold voltage of switching versus depth of grating for different cells (after photocuring) is plotted. The threshold decreases strongly with depth, suggesting that the anchoring strength strongly depends on the depth of the grating.

All of the cells were formed using ITO-coated glass having a monograting thereon. The monograting on each surface had the same structure, but a polymeric coating was deposited selectively on one grating surface in situ by photopolymerisation as previously described. The LC was E7 containing 4% of Sartomer SR349 photopolymerisable monomer. The cell spacing was set by 2 $\mu$m diameter balls. Point 1 of the graph shows results for monogratings of 30 to 40 nm depth (grating formed using 10% Shipley S1813 photoresist). Point 2 shows results for monogratings of 200 nm depth (40% S1813) and point 3 shows results for monogratings of 1000 nm depth (85% S1813). Similar switching thresholds were found for both antiparallel and twist cell arrangements.

Figure 7A:
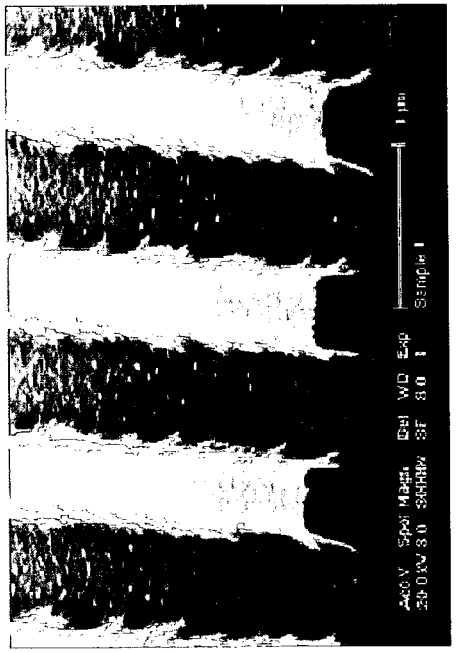
FIGS. 6 and 7 are SEMs of grating structures from devices in accordance with the invention.
Figure 7B:
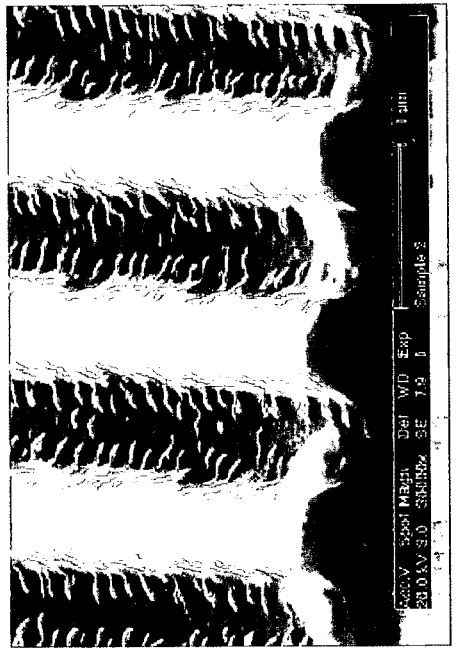
Figure 6A:
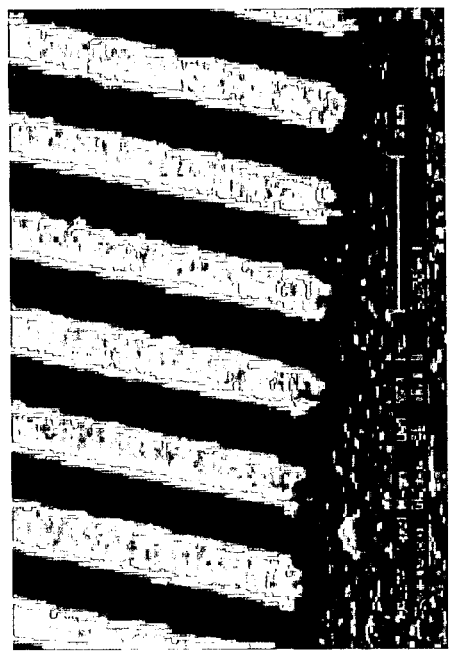
Figure 6B:
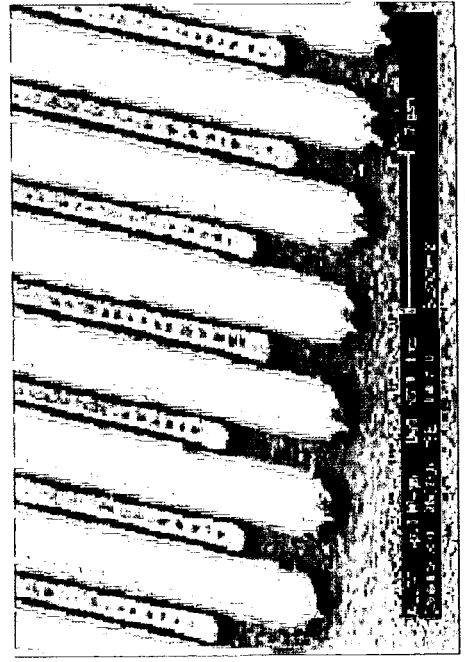

After photopolymerisation, the grating on the surface through which the UV light has been shone becomes coated with a polymeric coating while the opposed surface is substantially unchanged. The photomicrographs shown in FIGS. 6 and 7 are SEMs of opposed cell surfaces after photopolymerisation. The cells were opened and washed with acetone prior to taking the SEMs. FIG. 6*a* shows the non-exposed substrate and FIG. 6*b* shows the exposed substrate of a twist cell having a monograting of 1000 nm pitch and 500 nm depth. The LC is E7 with 4% SR349; cell thickness 2 $\mu$m. FIGS. 7*a* and 7*b* are of a similar cell but with higher magnification. The cured SR349 is a glassy solid at room temperature, having a glass transition temperature at about 67° C. The polymeric coating is substantially insoluble in the liquid crystal material and hence does not migrate to the other cell wall.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

While the present invention has been described with reference to specific embodiments, it should be understood that modifications and variations of the invention may be constructed without departing from the true spirit and scope of the invention.

What is claimed is:

1. A method of manufacturing a bistable liquid crystal device, the method comprising:
    initially forming a cell from first and second opposed spaced-apart cell walls enclosing a layer of nematic liquid crystal material having a photopolymerisable polymer precursor dissolved therein, wherein electrodes for applying an electric field across at least some of the liquid crystal material are provided on at least one cell wall, and the inner surface of at least the first cell wall is provided with a grating alignment structure; and
    effecting photopolymerisation of the polymer precursor so as to cause polymerisation to occur close to the first cell wall and deposition of a resulting polymeric material as a coating on the grating alignment structure on the first cell wall by illuminating the formed cell through the first cell wall with suitable light.

2. A method as claimed in claim 1, wherein substantially all of the illumination is directed into the cell through the first cell wall and not through the second cell wall.

3. A method as claimed in claim 1, wherein the polymeric material is a glassy or crystalline polymer at the operating temperature range of the device.

4. A method as claimed in claim 1, wherein the polymeric material is chemically different from the material of the grating alignment structure.

5. A method as claimed in claim 1, wherein illumination of the liquid crystal material is carried out at a temperature above the nematic to isotropic phase transition.

6. A method as claimed in claim 1, wherein the inner surface of the second cell wall is provided with an identical or similar grating alignment structure to that on the first cell wall.

7. A method as claimed in claim 1, wherein the polymeric material is substantially insoluble in the liquid crystal material.

8. The method as claimed in claim 1, wherein the polymerizing step results in the deposition of the polymeric material as the coating on the grating alignment structure.

9. A method of manufacturing a bistable liquid crystal device, the method comprising:
    initially forming a cell from first and second opposed spaced-apart cell walls enclosing a layer of nematic liquid crystal material having a photopolymerisable polymer precursor dissolved therein, wherein electrodes are provided on the inner surface of both cell walls for applying an electric field across at least some of the liquid crystal material, and the inner surfaces the cell walls are each provided with a substantially identical grating alignment structure; and
    effecting photopolymerisation of the polymer precursor close to the first cell wall and deposition of a resulting polymeric material as a coating on the grating alignment structure on the first cell wall by illuminating the formed cell through the first cell wall with suitable light, thereby producing an asymmetric device wherein two stable molecular configurations can exist within the nematic layer as a result of suitable electrical signals being applied to the electrodes.

10. A device as claimed in claim 9, wherein the polymeric coating is substantially insoluble in the liquid crystal material.

11. A device as claimed in claim 9, wherein the polymeric material has a glass transition temperature above 30° C.

12. A device as claimed in claim 9, wherein the grating alignment structure has a depth less than 1 $\mu$m.

13. A device as claimed in claim 12, wherein the grating alignment structure has a depth in the range 100–600 nm.

14. A method as claimed in claim 9, wherein the photopolymerizing step results in the polymeric material being deposited as a coating on the grating alignment structure.

15. A method of manufacturing a bistable liquid crystal device from a cell having first and second opposed spaced-apart cell walls enclosing a layer of nematic liquid crystal material having a photopolymerisable polymer precursor dissolved therein, and at least one cell wall including electrodes for applying an electric field across at least some of the liquid crystal material, the inner surface of at least the first cell wall including a grating alignment structure, the method comprising:
    polymerizing the polymer precursor close to the first cell wall, the polymerizing step being performed by photopolymerization of the polymer precursor by illuminating the formed cell through the first cell wall with suitable optical energy; and
    depositing the resulting polymeric material as a coating on the grating alignment structure on the first cell wall.

16. A method of manufacturing a bistable liquid crystal device from a cell having first and second opposed spaced-apart cell walls enclosing a layer of nematic liquid crystal material having a photopolymerisable polymer precursor dissolved therein, and at least one cell wall including electrodes for applying an electric field across at least some of the liquid crystal material, the inner surface of at least the first cell wall includes a grating alignment structure, the method comprising:
    photopolymerizing of the polymer precursor close to the first cell wall, the photopolymerization step being performed by illuminating the formed cell through the first cell wall with suitable light; and
    depositing a resulting polymeric material as a coating on the grating alignment structure on the first cell wall, the photopolymerization step being performed by illuminating the formed cell through the first cell wall with suitable light, thereby producing an asymmetric device wherein two stable molecular configurations can exist within the nematic layer as a result of suitable electrical signals being applied to the electrodes.

* * * * *